W. H. DUNN.
AUTOMOBILE STEERING COLUMN LOCK.
APPLICATION FILED MAR. 6, 1920.

1,396,508.

Patented Nov. 8, 1921.

INVENTOR
WILLIAM H. DUNN.
BY
Lockwood Lockwood
ATTORNEYS.

UNITED STATES PATENT OFFICE.

WILLIAM H. DUNN, OF ANDERSON, INDIANA.

AUTOMOBILE-STEERING-COLUMN LOCK.

1,396,508.   Specification of Letters Patent.   Patented Nov. 8, 1921.

Application filed March 6, 1920. Serial No. 363,723.

*To all whom it may concern:*

Be it known that I, WILLIAM H. DUNN, a citizen of the United States, and a resident of Anderson, county of Madison and State of Indiana, have invented a certain new and useful Automobile-Steering-Column Lock; and I do hereby declare that the following is a full, clear, and exact description thereof, reference being had to the accompanying drawings, in which like numerals refer to like parts.

The chief object of this invention is to provide upon the steering mechanism of a motor vehicle and the like, a locking device which is of few parts, easily attached thereto, with difficulty detached therefrom, and positive in its locking action.

One feature of the invention is in coöperating the lock casing with the usual steering column supporting bracket and replacing a portion of the usual steering column tube and supporting the lower end thereof.

A further feature of the invention is the provision of means for locking the steering mechanism in any one of the multiplicity of positions.

The full nature of the invention will be understood from the accompanying drawings and the following description and claims.

Figure 1:
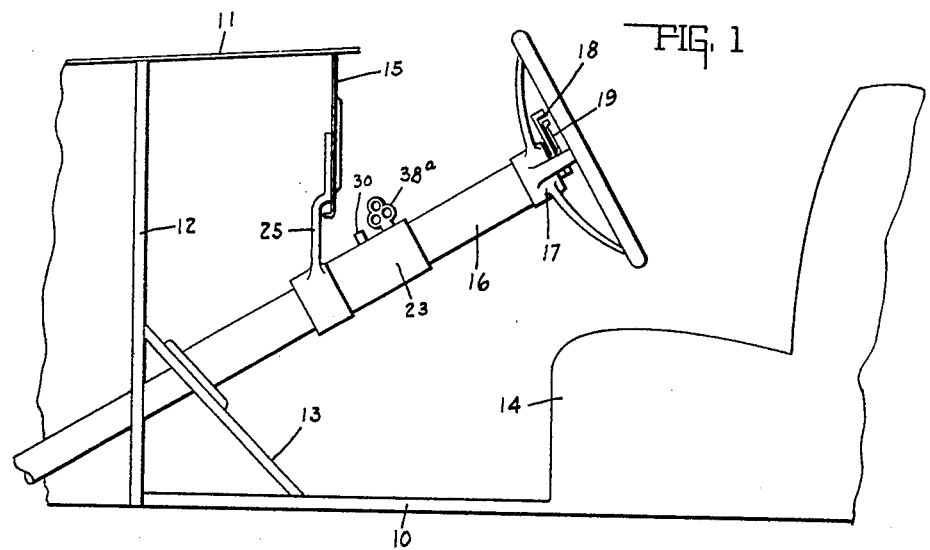
Figure 2:
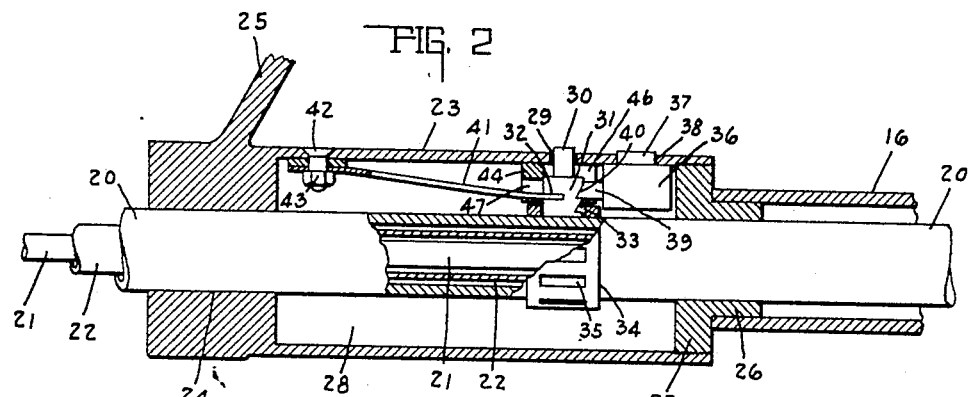
Figure 3:
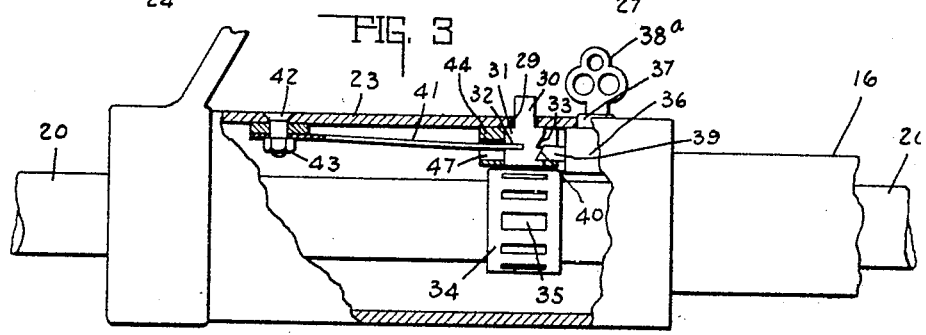
Figure 4:
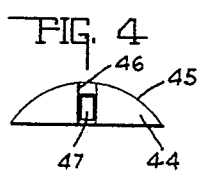
Figure 5:
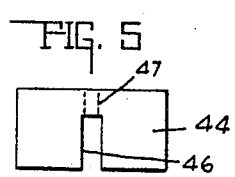

Figure 1 is a side elevational view of a motor vehicle and the like showing the improved lock, steering column, steering wheel and steering column bracket in assembled relation. Fig. 2 is a longitudinal central sectional view of the lock in the locking position and the steering column tube with the associated mechanism therein, parts being broken away to show other parts in detail. Fig. 3 is a side view of a lock casing and steering column tube, parts being broken away to show the lock in the unlocked or released position. Fig. 4 is an end view of the means for non-rotatably securing the locking means to the casing. Fig. 5 is a top plan view of the same.

In the drawings 10 indicates the chassis of a motor vehicle upon which is supported the usual cowl 11, front dash 12, toe board 13 and driver's seat 14. Supported by the chassis is the usual instrument board 15, and positioned beneath the same and extending through the toe board is the steering mechanism, herein shown including the usual steering column tube 16, wheel 17, and fuel and ignition controlling levers, 18 and 19 respectively, all of the foregoing being of the usual construction and old in the art. Within the steering column tube 16 is the usual steering post 20, within which are the usual fuel and ignition controlling tubes 21 and 22, said tubes being connected respectively with the levers 18 and 19 in the usual manner.

Positioned upon the steering post and adjacent one end of the steering column tube is positioned a lock casing 23, said casing being closed at one end to provide a bearing portion 24 in which the steering post 20 is rotatably supported. The casing 23 is stationarily secured to the instrument board through the medium of an upwardly extending bracket arm 25. Said bracket arm is herein shown integral with the bearing portion 24 of the locking casing 23. The upper end of said casing is open and threaded, and within said open end is secured a bushing 26, said bushing rotatably supporting said steering post and having an outwardly extending collar portion 27, the same having a threaded connection with the threaded open end of the casing 23, said collar and bushing closing said casing. As shown clearly in Fig. 2, the steering column tube surrounds the bushing 26 and is limited in longitudinal movement by said collar and the steering wheel, as shown in Fig. 1. It will be understood that to gain access to the interior of the locking chamber, the steering wheel 17 and associated levers must be removed from the steering column tube and the latter withdrawn axially of the steering post so that the collar 27 may be removed from the casing.

Within the lock casing 23 there is formed a locking chamber 28 in which there is positioned the coöperating locking mechanism whereby the steering post 20 may be locked in any one of a number of positions. The means for locking said post is composed of few parts and these are of simple construction. Extending through the locking casing there is an opening 29 and slidable through said opening is a push button 30, said push button being connected at its inner end with a latching plunger 31, said plunger being provided with a transversely extending slot 32 upon the lower face thereof, and a plurality of parallel slots 33 upon the upper face thereof, said slots 33 having inclined faces. Suitably secured to the steering post 20, adjacent the opening 29 and the latching plunger 31, there is positioned a latch receiving collar 34. If desired, said collar may be formed integral with the steering mast, but preferably is secured thereto by means not shown. The collar 34, around its exterior periphery, is provided with a plurality of parallel slots 35, said slots extending longitudinally of said shaft and being spaced from one another. The slots 35 are similar in shape to the latching plunger 31, and the latter is adapted to be projected within one of said slots and engage the walls thereof to hold said collar and said shaft against rotational movement. Similarly said latch will also hold said collar and said shaft against axial movement as well.

Within the casing 23, and adjacent the push button 30 and latching plunger 31, is a lock 36, said lock being suitably secured to said casing and having a cylinder portion 37 projecting therefrom through the opening 38 in the lock casing adjacent the opening 29. Said lock 36 may be of any suitable permutation type, but preferably is key operated. It will be understood that the key 38ª, for operating the lock 36, is individual and is the only key which will operate said lock, as is customary in permutation locks. Projecting outwardly from said lock and within said casing and parallel to said shaft is the locking tooth or member 39, the same being adapted to be projected from or retracted within the lock 36 when the key 38 is actuated. It will be understood that the locking tooth 39 is yieldingly supported within the lock 36 and is projected by the yielding means, not shown, but which is an integral part of the lock into engagement with the latching plunger and maintained therein. The outer edge of the locking tooth 39 is provided with an inclined face 40, said inclined face being suitably beveled to correspond with and be seated within one of said parallel inclined faced slots 33. As shown in the drawings the locking tooth is normally in engagement with the latching plunger 31. When the parts are in the position shown in Fig. 2 the locking tooth is positioned in the inclined slot adjacent the casing, said plunger then being in the locking position. When, as shown in Fig. 3, said tooth is in engagement with the inclined slot adjacent the steering post, said plunger is in the unlocked or released position. When said parts are in the latter position the push button 30 projects outwardly from the casing 23. By pushing the push button 30 inwardly the latching plunger is forced centrally within the chamber 28, the inclined face of the slot 33 engaging upon the inclined face 40 of the locking tooth 39 and forcing the latter within the lock 36 in opposition to the yielding means within the lock until the push button and plunger are in the position shown in Fig. 2, whereupon the locking dog, under the influence of the yielding means within the lock 36, is again projected into the outer slot 33, as shown. When thus positioned in the outer slot the latching plunger cannot be withdrawn to the position shown in Fig. 3 unless the tooth 39 is retracted from said slot, which only occurs when the key 38ª is actuated.

The means for returning the locking plunger from the position shown in Fig. 2 to that shown in Fig. 3 and retaining the same until the locking dog 39 engages in the lower inclined slot 33, is a spring 41 suitably secured within the casing and upon said casing by means of the countersunk bolt 42 and nut 43 respectively. The opposite end of said spring is suitably secured to the latching plunger by being seated in the transverse slot 32.

From the foregoing description it will be understood that when the parts are in the position shown in Fig. 3 the push button 30 is engaged and pressed inwardly. The inclined faced slot 33 forces the locking dog out of engagement therewith and into the adjacent inclined slot 33. Simultaneously therewith the plunger is projected into one of said axially extending slots 35 in the collar 34. The steering post or shaft therefore is held in locked position with respect to the casing 23 and the motor vehicle chassis, since the latching plunger is non-rotatably secured in the lock casing by means of the plunger 30, or any other suitable means. Said means may comprise suitable lugs positioned adjacent the latching plunger to prevent rotational movement of the plunger with respect to the casing. Herein, however, there is shown in Figs. 4 and 5 a locking and a centering plug member 44, said member 44 having an arcuately formed face 45 to conform to the interior of the tubular casing 23 and to which said plug member is suitably secured. The member 44 is provided with a radial slot 46, the same extending partially across the plug, as shown in Fig. 5. A longitudinally extending slot 46 extends through said plug member and communicates with the slot 47, as shown in said figures. The slot 47 is positioned such that the spring 41 extends through the same and has full freedom of motion. The walls of the slot 46 coöperate with the latching plunger 31 and secure the same non-rotatably within the casing 23, it being understood that the plug 44 is positioned between the casing and the collar and spaced from said collar a sufficient distance to permit the rotation of the collar as shown in Fig. 3.

When it is desired to unlock the steering post from the casing the key 38ª is turned to retract the locking tooth 39 from engagement with the latching plunger 31. Said plunger under the influence of the spring 41 is returned to the position shown in Fig. 3, whereupon the latching tooth 39 is again projected forwardly into engagement with the other of said inclined slots 35 and holds the same in the unlocked position. Thus the locking means is positive in its action, since the same is held in the locked or unlocked position by means of the locking tooth 39. Furthermore, the lock is simple in operation since depressing the push button 30 suffices to lock the post to the casing in any desired position.

From the foregoing it will be understood that there is provided a lock which is positioned adjacent the steering post and within a casing surrounding the same, said casing replacing a portion of the steering column tube and simultaneously providing a bearing for the steering post and associated mechanism. While the invention has been described in great detail both as to its arrangement and as to the particular construction of the locking means, the broader features thereof are not to be limited by the detailed description of the same.

The invention claimed is:

1. In an automobile, the combination with a steering post, and a steering column tube, of a hollow tubular casing surrounding said post and spaced therefrom and forming a portion of the inclosing steering column tube, and locking means positioned in said space between said post and the tube inclosed by said casing to lock the post to the casing, including a plunger positioned within said casing and between said casing and said post and movable radially thereof, push button means slidably mounted in said casing and projecting therefrom for projecting the plunger into engagement with the post, a centering member positioned between said post and said casing and slidably supporting said plunger, a locking tooth slidably supported in said plunger centering member and guided thereby for locking said plunger in the locked position and supporting said plunger in the locked position and supporting said plunger in the unlocked position, means for actuating said plunger in the locked and unlocked position, means for actuating said tooth, and spring means for normally holding said plunger in the non-engageable position.

2. In an automobile, the combination with a steering post, and a steering column tube, of a hollow tubular casing surrounding said post and spaced therefrom and forming a portion of the inclosing steering column tube, and locking means positioned in said space between said post and the tube inclosed by said casing to lock the post to the casing, including collar means secured to said post and provided with a slot therein, a plunger positioned in the space between said casing and said post and movable radially thereof, push button means slidably mounted in said casing and projecting therefrom for projecting the plunger into engagement with the collar means slot, a centering member positioned between said collar and said casing and slidably supporting said plunger, a locking tooth slidably supported in said plunger centering member and guided thereby for locking said plunger in the locked position and supporting said plunger in the unlocked position, means for actuating said tooth, and spring means for normally holding said plunger in the non-engageable position.

3. In an automobile lock the combination of a steering post, a steering column tube, a closed lock casing concentric with said post and spaced therefrom and forming a portion of said tube, a collar positioned upon said post and provided with a slot, a plunger within said casing and between said casing and said post and movable radially thereof and seatable in said slot, push button means slidably mounted in said casing and projecting therefrom for projecting the plunger into engagement with said slotted collar, spring means normally holding said plunger out of engagement with said collar, a positive locking tooth for holding said plunger in the locked or unlocked position, and means for retracting said locking tooth.

4. In an automobile lock the combination of a steering post, a closed casing surrounding said post and spaced therefrom, a latching plunger positioned between said casing and said post and movable axially thereof into engagement with the latter to lock the same to the former, a spring positioned adjacent said shaft and having one end secured to said casing and the other end secured to said latching plunger, a locking tooth positioned adjacent said shaft and within said casing to normally engage and lock said latching plunger in the locked position and supporting said plunger in the unlocked position, means for positively retracting said tooth from engagement with said latching plunger, and a plug positioned within said casing adjacent said shaft and secured to said casing, said plug being provided with a transverse slot extending partially therethrough, said plunger being seatable in said slot to non-rotatably secure the plunger within the casing, said tooth being movable in said slot into and out of engagement with said latching plunger, said plug further having a longitudinally extending slot communicating with said transverse slot, said last mentioned slot permitting said spring to extend therethrough and engage said latching plunger.

In witness whereof I have hereunto affixed my signature.

WILLIAM H. DUNN.